US011123635B2

(12) United States Patent
Brown

(10) Patent No.: US 11,123,635 B2
(45) Date of Patent: Sep. 21, 2021

(54) GAME APPLICATION LAUNCH SYSTEM AND METHOD

(71) Applicant: Sony Interactive Entertainment Inc., Tokyo (JP)

(72) Inventor: Simon Brown, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/483,861

(22) PCT Filed: Jan. 25, 2018

(86) PCT No.: PCT/GB2018/050212
§ 371 (c)(1),
(2) Date: Aug. 6, 2019

(87) PCT Pub. No.: WO2018/150155
PCT Pub. Date: Aug. 23, 2018

(65) Prior Publication Data
US 2020/0016488 A1 Jan. 16, 2020

(30) Foreign Application Priority Data
Feb. 20, 2017 (GB) .................................... 1702682

(51) Int. Cl.
*A63F 13/48* (2014.01)
*A63F 13/533* (2014.01)
*A63F 13/69* (2014.01)

(52) U.S. Cl.
CPC ............ *A63F 13/48* (2014.09); *A63F 13/533* (2014.09); *A63F 13/69* (2014.09); *A63F 2300/308* (2013.01); *A63F 2300/609* (2013.01)

(58) Field of Classification Search
CPC ........ A63F 13/48; A63F 13/533; A63F 13/69; A63F 2300/308
See application file for complete search history.

(56) References Cited

U.S. PATENT DOCUMENTS

| 6,028,604 A | * | 2/2000 | Matthews, III | ....... | G06F 3/0481 |
| | | | | | 715/821 |
| 6,266,059 B1 | * | 7/2001 | Matthews, III | ......... | G06F 9/451 |
| | | | | | 715/810 |

(Continued)

FOREIGN PATENT DOCUMENTS

GB 2317796 A 4/1998

OTHER PUBLICATIONS

Firaxis Games, Screenshots from Sid Meier's Civilization 5, 2010, 2K Games, Run on Microsoft Windows (Year: 2010).*

(Continued)

*Primary Examiner* — Chase E Leichliter
(74) *Attorney, Agent, or Firm* — Matthew B. Dernier, Esq.

(57) ABSTRACT

A method of launching a game application includes: providing a game application launch object to an operating system, providing data specifying a plurality of modes of operation for the game application in association with the game application launch object, providing a user interface in which at least a subset of the plurality of modes of operation are presented to a user when that user performs a predetermined interaction with the game application launch object, receiving a user selection indicating a selected mode of operation, and launching the game application into a playable game state that is dependent upon the selected mode of operation.

15 Claims, 2 Drawing Sheets

(56) References Cited

U.S. PATENT DOCUMENTS

| | | | | |
|---|---|---|---|---|
| 2002/0112025 | A1* | 8/2002 | Johansson | G06T 17/00 709/217 |
| 2005/0086612 | A1* | 4/2005 | Gettman | G06Q 30/02 715/848 |
| 2006/0287106 | A1* | 12/2006 | Jensen | A63F 13/12 463/42 |
| 2007/0155204 | A1* | 7/2007 | Klitsner | A63F 13/71 439/131 |
| 2010/0205559 | A1* | 8/2010 | Rose | G06F 3/0482 715/781 |
| 2010/0293365 | A1* | 11/2010 | Tandon | A63F 13/10 713/2 |
| 2011/0242361 | A1* | 10/2011 | Kuwahara | H04N 5/2252 348/231.4 |
| 2012/0270643 | A1* | 10/2012 | Sienkiewicz | A63F 13/843 463/29 |
| 2013/0005489 | A1* | 1/2013 | Santhosh | A63F 13/213 463/43 |
| 2014/0024457 | A1 | 1/2014 | Justice | |
| 2014/0075385 | A1* | 3/2014 | Wan | G06Q 30/0601 715/812 |
| 2014/0108936 | A1* | 4/2014 | Khosropour | G06F 9/451 715/735 |
| 2014/0302935 | A1* | 10/2014 | Royce | A63F 13/44 463/42 |
| 2014/0372356 | A1* | 12/2014 | Bilal | G06F 9/44578 706/46 |
| 2015/0134491 | A1 | 5/2015 | Ostroff | |
| 2015/0141152 | A1* | 5/2015 | Justice | A63F 13/30 463/42 |
| 2015/0196844 | A1* | 7/2015 | Liendo | A63F 13/48 463/43 |
| 2015/0222947 | A1* | 8/2015 | Oh | A63F 13/211 725/51 |
| 2015/0248204 | A1* | 9/2015 | Morita | G06F 3/0482 715/802 |
| 2016/0008720 | A1* | 1/2016 | Inukai | A63F 13/352 463/29 |
| 2016/0067594 | A1* | 3/2016 | Schwind | A63F 3/0023 463/31 |
| 2016/0256784 | A1* | 9/2016 | Schultz | A63F 13/358 |
| 2017/0212771 | A1* | 7/2017 | Weissberg | G06F 3/04845 |
| 2017/0239563 | A1* | 8/2017 | Prakash | A63F 13/795 |
| 2017/0239564 | A1* | 8/2017 | Prakash | A63F 13/25 |

OTHER PUBLICATIONS

International Search Report and Written Opinion for corresponding PCT Application No. PCT/GB2018/050212, 15 pages, dated Sep. 24, 2018.

Combined Search and Examination Report for corresponding GB Application No. 1702682.4, 4 pages, dated Aug. 1, 2017.

Examination Report for corresponding GB Application No. 1702682.4, 3 pages, dated Apr. 1, 2020.

Examination Report for corresponding GB Application No. 1702682.4, 5 pages, dated Oct. 14, 2020.

Mike Hazleton, "The Sims 3 Walkthrough and Guide", https://www.supercheats.com/ guides/the-sims-3/gamelauncher, 4 pages, Apr. 1, 2012.

Whatamioing, "Sid Meier's Civilization V—How to get back to the old launcher", https://steamcommunity.com/sharedfiles/filedetails/?id=1577795928. 4 pages, Nov. 29, 2018.

Examination Report for corresponding GB Application No. 1702682.4, 5 pages, dated Jan. 27, 2021.

"Introduction:The Sims 3 Expansion and Stuff Pack Manager" by Sims VIP. http://simsvip.com/2015/11/11/introduction-thesims-3-expansion-and-stuff-pack-manager/, SimsVIP, 5 pages, Nov. 11, 2015.

"Installing the Sims 3 (full)pc" by will69w. https://www.youtube.com/watch?v=Fhb WXOn5Qgg, 3 pages, Jan. 1, 2011.

Examination Report for corresponding GB Application No. 1702682.4, 5 pages, dated Mar. 25, 2021.

* cited by examiner

GAME APPLICATION LAUNCH SYSTEM AND METHOD

BACKGROUND

The present invention relates to a system and method of launching a game application.

In recent times, applications such as videogames gave grown increasingly large in order to provide richer and more complex content. However, as a consequence it can now take a long time to load a game, and the user can experience frustration in the time between deciding to play the game, and actually beginning to play.

SUMMARY

The present invention seeks to alleviate or mitigate this problem.

In a first aspect, a method of launching a game application is provided according to one or more embodiments.

In another aspect, a game application launch system is provided according to one or more embodiments.

Further respective aspects and features of the invention are defined in the appended claims.

BRIEF DESCRIPTION OF THE DRAWING

Embodiments of the present invention will now be described by way of example with reference to the accompanying drawings, in which.

DETAILED DESCRIPTION

Figure 1:
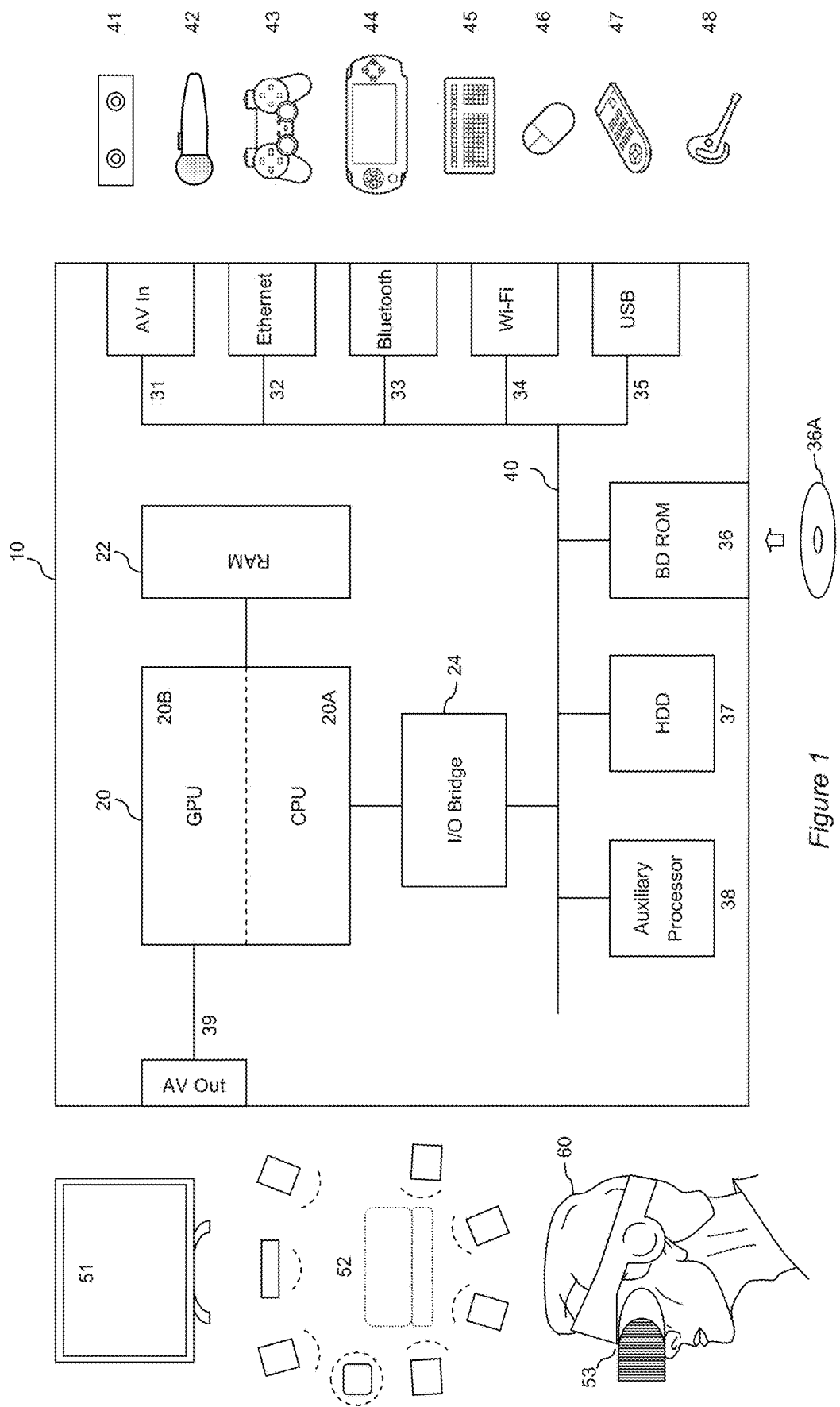
FIG. 1 is a schematic diagram of a game application launch system in accordance with embodiments of the present invention.

A system and method of launching a game application are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Modern videogames can be very complex, and provide the user with many options for play. Common examples of options include the ability to choose single player or multiplayer modes, and/or to play the original game or so-called 'DLC' or downloadable content, which itself may be integrated into the main game or behave as a separate region or chapter within the game, or as a companion game with notably different characters and environments. DLC may take the form of content provided by the developers of the game, or content or alterations to the game created by third parties (so-called 'mods').

Likewise, the user may wish to explore a number of in-game options, such as difficulty levels, choice of character, and in some games, to re-visit certain parts of the game to explore different branches of the game's story by changing their own in-game actions.

As a result of all these options, most games load a start menu that allows the user to choose how they want to play the game, by providing choices such as those listed above.

In order to provide a high quality experience for the user, this menu itself often uses the in-game engine to provide a vignette of the game as a backdrop or mechanism for navigating through the options on offer, thus necessitating the loading of the vignette assets. Although this is not a necessary feature, it is commonplace. In any event, the need to load a menu (with or without game engine and menu-specific assets) takes a finite amount of time. Then in addition, the user must navigate through the menu to make their selection.

To expedite this process, a number of settings/configurations can be set by default, such as difficulty level or main character appearance. Also, some of the most common user choices can be prioritised in the menu structure. For example, when a game is played for the first time, menu options such as 'Start New Game', 'Tutorial' and 'Options' may be prominent.

On subsequent uses of the game, the menu structure may change so that 'Continue' (as opposed to 'Start') is shown. Furthermore the tutorials may now be demoted within a menu list or added to a sub-list (potentially after the user has reached a key point within the game, or after an elapsed period of play, after which their competency with the game can be assumed).

Nevertheless, frequently the above menu can be seen as an unnecessary or undesirable step in playing the game, particularly when the user knows how they want to use the game (for example if they just want to continue their adventure, or play a particular on-line multiplayer game).

Figure 2:
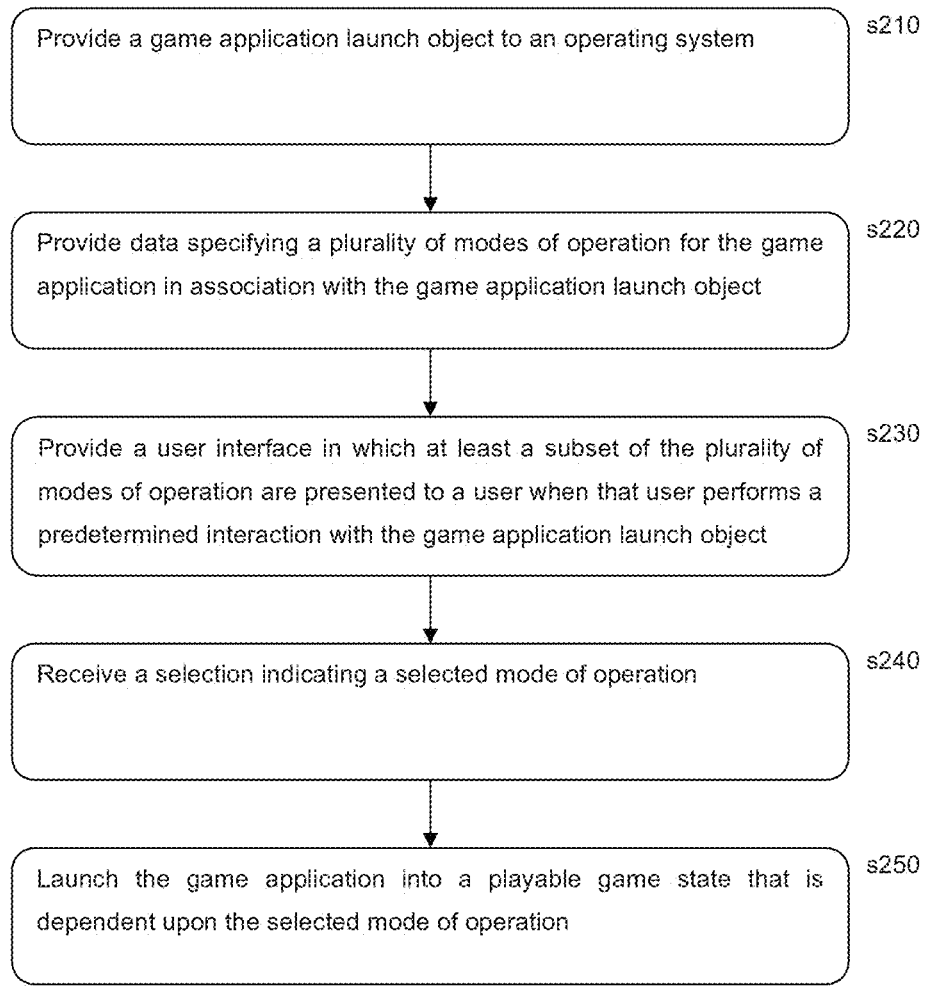
FIG. 2 is a flow diagram of a method of launching a game application in accordance with embodiments of the present invention.

Accordingly, and referring now to FIG. 2, in an embodiment of the present invention a method of launching a game application comprises:

In a first step s210, providing a game application launch object to an operating system (and/or a helper application used to curate, organise or otherwise service a plurality of games, and hence not part of the game itself). Typically this object is in effect a shortcut, specifying the game executable location in association with a graphical object displayable by the graphical user interface of the operating system or helper app. The object may take the appearance of an icon, a selectable tile or the like within the GUI. The object may also contain any conventional metadata (e.g. argument data) useful to the OS, such as for example whether the executable should run in an elevated privilege mode, or specifying that it should run in a full-screen rather than a window, or the like.

A second step s220 then comprises providing data specifying a plurality of modes of operation for the game application in association with the game application launch object. This data may be provided when the game is first installed, or equally when the game is updated, or DLC or other mods are added.

Optionally the data specifying the plurality of modes of operation may use a common or standardised format for describing such modes that is used in multiple game applications. This option may be of use where the OS or helper app manages the game launch and benefits from being able to parse a common specification of common game modes. The data may thus for example take the form of a binary sequence of include/exclude selections for a predetermined list of modes, and optionally a list of descriptive text items to use for these modes in place of default descriptors.

Alternatively or in addition, the data specifying the plurality of modes may use a proprietary format for describing such modes, and this may be conveyed in any suitable manner.

It will be appreciated that where both options are in use, the data specifying the plurality of modes according to each option may complement one another, so that common modes of operation use the common format, but modes of operation unique to a particular game (or simply unsupported by the OS or helper app) use a proprietary format that can be parsed by the game executable. Clearly also the standardised format may optionally comprise a wrapper allowing the OS or helper app to pass such proprietary data to the particular game in a known manner, and/or may facilitate proprietary game modes by providing user-definable mode fields or extensions within the common format.

Furthermore, as noted above in either case the data specifying a plurality of modes of operation may also comprise descriptive matter (text and/or graphical elements) for each supported mode of operation, which can be presented to the user. Otherwise, default descriptions may be used.

Accordingly, a third step s230 comprises providing a user interface in which at least a subset of the plurality of modes of operation are presented to a user when that user performs a predetermined interaction with the game application launch object.

Hence, using the PlayStation 4 ® and Dual Shock 4 Controller® as a non-limiting example, a user may scroll through a plurality of games presented as tiles on screen, with a current game highlighted for example with a border, or by expanding the tile.

If the user presses a first control (for example, the 'X' button on the controller), then optionally the game may launch conventionally, presenting the user with an in-game menu in due course.

However, in a fourth step s240, the system receives a user selection (such as for example a press of the triangle button) indicating that the user wishes to launch the game directly into a user-selected mode; The OS or helper app uses the descriptive matter to display some or all of the available modes of operation to the user (as will be discussed later herein), and receives a selection indicating a selected mode of operation (for example by highlighting one of the displayed modes of operation and selecting it). A similar function on a mouse-driven interface may be provided by right-clicking on a game icon to see the modes of operation presented in a context menu.

It will be appreciated that the user selection may simply constitute the act of scrolling though available games to highlight a current game, and the graphical highlighting effect (e.g. expanding a tile) also provides the displayed modes of operation to the user, optionally with a default selection to start normally. Similarly in a mouse-driven interface, the modes of operation may be provided as a mouse-over function, or after clicking an icon once (where normal launching of the game requires a second click).

Notably therefore, the user makes their game mode selection before the game is launched by the OS or helper app.

In response, a fifth step s250 comprises launching the game application into a playable game state that is dependent upon the selected mode of operation. This may be done by the OS or helper app retrieving the data specifying the mode of operation corresponding to the user's selection, and passing this to the game executable using any appropriate means, such as for example an argument in the application call, or placing or modifying a configuration file in a predetermined location expected by the game executable (this location could be for example explicitly specified during game installation, or could for example be in the same directory as the executable itself).

In any event, the game executable is therefore provided with the information needed to select the desired mode of operation and proceed to a playable game state (optionally paused, for example, so that the user can prepare themselves) rather than proceeding to the conventional menu first.

Launching of a game application into a playable game state in this way may be implemented in any suitable manner Hence in an embodiment of the present invention, the game application completely bypasses the menu stage that would otherwise be presented to the user by default, and proceeds to load game assets and any settings specific to the selected mode of operation.

Alternatively, depending on how the game is written, in an embodiment of the present invention the step of launching the game application comprises loading at least that part of the menu stage of the game application that responds to user selection during normal use of the menu stage (hence for example suppressing the loading of a game vignette using the game engine), and providing a simulated user selection to that part of the menu stage responsive to the selected mode of operation, before then loading game assets specific to the selected mode of operation. Again depending on how the game is written, the simulated user selection may take the form of a keystroke sequence to virtually navigate the menu structure, or may simply pass the effective result of such a selection process (such as for example indicating option #21 was selected out of 32 possibilities) to the relevant part of the menu stage. The existing menu system may then launch the rest of the game in the relevant mode in a conventional manner.

This approach may be of use where the present invention is to be retrofitted to an existing game, or where it is simply easier to simulate implementation of the menu within the game in order to support both the ability to select game modes before launch, and to select game modes conventionally via the menu as and when the user prefers to do so in this way.

In any event, the result is that the game launches directly into the relevant playable game state without any further user interaction being necessary.

In order to further save time during launch, it will be appreciated that a game application typically comprises one or more common components that are common to two or more modes of operation. Examples may be the game engine itself, and perhaps assets relating to the player's own character. Hence optionally in an embodiment of the present invention, the operating system or helper app detects with the user is interacting with the game application launch object (for example in the manners described previously herein), and if so, commencing the loading of the one or more common components of the game application before the user has selected to launch the game in any particular mode.

Clearly in the event that the user does not decide to launch the game, then loaded data can be discarded from memory (e.g. from RAM, not uninstalled from a hard drive or the like).

Similarly, the game application is likely to comprise one or more specific components that are specific to one or more modes of operation. Examples include maps and textures only provided in single player or multiplayer modes. Hence optionally in an embodiment of the present invention, the operating system or helper app detects when the user is interacting with the game application launch object in such a way as to highlight a specific game mode using the user interface, and if so commenced the loading of the one or more specific components of the game application corresponding to the highlighted specific game mode before the user has selected to launch the game.

This may give the game launch an additional head start on loading the relevant components of the game that is equal to the time between the user highlighting the relevant game mode and actually selecting it.

Similarly again, the game application will comprise components used during the most recent state of play of the game by the user (for example, common assets and/or assets specific to a particular level or area within the game last played by the user). Data indicating such components will typically be included within a user's most recent game save data file. Hence optionally in an embodiment of the present invention, the operating system or helper app detects when the user is interacting with the game application launch object, and if so then such a data file indicating a most recent state of play the game by the user is accessed to determine the relevant assets needed to launch the game, and the operating system or helper app can commence loading one or more components required to launch the game into a playable state corresponding to the indicated most recent state of play.

Consequently when a user interacts with the game application launch object, even before they select to launch the game, the game can begin to load with the components specific to their most recent state of play (i.e. commence to load the game with the most recently saved game state).

Clearly again in the event that the user does not select to 'continue' play of the game using the UI associated with the game application launch object, the loaded specific assets may be discarded from memory, in favour of whatever assets are required for the actually selected gameplay mode.

The above principle can be generalised so that the OS or helper app learns what mode of operation is most commonly selected by the user, and begins to load components relevant to that mode of operation when the user begins to interact with the game application launch object. Again if it transpires that the user wishes to launch the game in a different mode of operation or to use the conventional menu system, then those components can be discarded from memory. Alternatively or in addition, where the OS or helper app learns what mode of operation is most commonly cited by the user, the options presented to the user in response to these performing a predetermined interaction with the game application launch object can be ordered or structured to promote the most commonly selected mode or modes of operation to simplify the user's selection.

Examples of the modes of operation comprise one or more selected from the list consisting of a starting a single player game, continuing a single player game, and starting an online game.

Similarly, examples of the modes of operation comprise one or more selected from the list consisting of playing the game application in its original form, and playing the game application in a modified form.

Again, examples of the modes of operation comprise one or more selected from the list consisting of playing the game application from the start, and playing the game application from a saved game state.

It will be appreciated that games may be patched during their lifetimes to provide additional functionality. For example, a single player game may be patched to provide a multiplayer mode. Similarly, subsequently installed DLC or mods may provide new modes of play. Accordingly, in an embodiment of the present invention the method of watching a game application comprises the step of installing additional gain application data (such as a patch, DLC or mod) and providing additional data specifying one or more additional modes of operation for the game application, for association with the game application launch object.

The latter step of providing additional data may take the form of replacing the existing game application launch object together with its attendant data, or just replacing the data specifying the plurality of modes of operation, or alternatively it may comprise simply modifying the existing data or adding to the existing data.

In this way, new game mode functionality can be accessed using the above described techniques as and when it becomes available.

It will be appreciated that the above techniques are distinct from known functions such as selecting which of several applications should be used to open a document, or embedding settings within a saved document so that these settings and an associated user interface for an application are configured by the document (such as for example whether or not 'track changes' is active for a document when it is opened in Microsoft Word®).

It will be appreciated that the above techniques may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

An example of conventional hardware that may be suitably adapted is the Sony® PlayStation 4®.

Referring to FIG. 1, this schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Hence under suitable software instruction, the PlayStation 4 (or any other console, personal computer, tablet, mobile phone or the like) may serve as a game application launch system, comprising memory adapted to store a game application launch object for use by an operating system (such as HDD 37 and RAM 22); memory adapted to store, in association with the game application launch object, data specifying a plurality of modes of operation for the game application again (such as HDD 37 and RAM 22); a user interface processor (such as CPU 20A and/or GPU 20B) adapted to provide a user interface in which at least a subset of the plurality of modes of operation are presented to a user when that user performs a predetermined interaction with the game application launch object, and adapted to receive a user selection (for example via controller 42 or 43) indicating a selected mode of operation; and game application launch processor (again such as CPU 20A and/or GPU 20B) adapted to launch the game application into a playable game state that is dependent upon the selected mode of operation.

Such a game application launch system would be similarly operable to implement the other methods and techniques described previously herein and hence where the game application comprises one or more common components that are common to two or more modes of operation, the user interface processor may be adapted to detect whether the user interacts with the game application launch object, and if so, the game application launch processor may be adapted to commence the loading the one or more common components of the game application before the user has selected to launch the game.

Similarly, where the game application comprises one or more components used during the most recent state of play of the game by a user, the game application launch processor may be adapted to access a data file indicating a most recent state of play of the game by the user, and the game application launch processor may be adapted to commence loading one or more components required to launch the game into a playable state corresponding to the indicated most recent state of play.

The invention claimed is:

1. A method of launching a game application, comprising the steps of:
   providing a game application launch object to an operating system or helper application;
   providing data specifying a plurality of modes of operation for the game application in association with the game application launch object;
   providing a user interface in which at least a subset of the plurality of modes of operation are presented to a user when that user performs a predetermined interaction with the game application launch object;
   receiving a user selection indicating a selected mode of operation; and
   launching the game application into a playable game state that is dependent upon the selected mode of operation.

2. The method according to claim 1, in which the game application launch object is a shortcut specifying a game executable location in association with a graphical object displayable by the user interface of the operating system.

3. The method according to claim 1, in which the user interface is provided by one selected from a list consisting of
   i. the operating system; and
   ii. a helper application other than the game application,
   and the method comprises the step of providing the selected mode of operation to the game application as data in a predetermined format.

4. The method according to claim 1, wherein the step of launching the game application comprises the steps of:
   bypassing a menu stage of the game application that would otherwise by presented to the user by default; and
   loading game assets specific to the selected mode of operation.

5. The method according to claim 1, wherein the step of launching the game application comprises the steps of:
   loading at least that part of a menu stage of the game application that responds to a user selection during normal use of the menu stage;
   providing a simulated user selection to that part of the menu stage responsive to the selected mode of operation; and
   loading game assets specific to the selected mode of operation.

6. The method according to claim 1, in which the game application comprises one or more common components that are common to two or more modes of operation, and in which the method comprises the steps of:
   detecting whether the user interacts with the game application launch object;
   and if so;
   commencing the loading the one or more common components of the game application before the user has selected to launch the game.

7. The method according to claim 6, in which the game application comprises one or more specific components that are specific to one or more modes of operation, and in which the method comprises the steps of:
   detecting whether the user highlights a specific game mode using the user interface;
   and if so;
   commencing the loading of the one or more specific components of the game application corresponding to the highlighted specific game mode before the user has selected to launch the game.

8. The method according to claim 1, in which the game application comprises one or more components used during the most recent state of play of the game by a user, and in which the method comprises the steps of:
   detecting whether the user interacts with the game application launch object;
   and if so;
   accessing a data file indicating a most recent state of play of the game by the user; and
   commencing loading one or more components required to launch the game into a playable state corresponding to the indicated most recent state of play.

9. The method according to claim 1, in which the modes of operation comprise one or more selected from the list consisting of:
   i. starting a single player game;
   ii. continuing a single player game; and
   iii. starting an online game.

10. The method according to claim 1, in which the modes of operation comprise one or more selected from the list consisting of:
    i. playing the game application in its original form; and
    ii. playing the game application in a modified form.

11. The method according to claim 1, in which the method comprises the steps of:
    installing additional game application data; and
    providing additional data specifying one or more additional modes of operation for the game application, for association with the game application launch object.

12. A non-transitory, computer-readable storage medium containing a computer program, which when executed by a computer system, causes the computer system to carry out a method of launching a game application, the method comprising the steps of:
    providing a game application launch object to an operating system or helper application;
    providing data specifying a plurality of modes of operation for the game application in association with the game application launch object;
    providing a user interface in which at least a subset of the plurality of modes of operation are presented to a user when that user performs a predetermined interaction with the game application launch object;
    receiving a user selection indicating a selected mode of operation; and
    launching the game application into a playable game state that is dependent upon the selected mode of operation.

13. A game application launch system, comprising:
    memory adapted to store a game application launch object for use by an operating system or helper application;
    memory adapted to store, in association with the game application launch object, data specifying a plurality of modes of operation for the game application;
    a user interface processor adapted to provide a user interface in which at least a subset of the plurality of modes of operation are presented to a user when that user performs a predetermined interaction with the game application launch object, and adapted to receive a user selection indicating a selected mode of operation; and
    a game application launch processor adapted to launch the game application into a playable game state that is dependent upon the selected mode of operation.

14. The game application launch system of claim 13, in which the game application comprises one or more common components that are common to two or more modes of operation, and in which:
    the user interface processor is adapted to detect whether the user interacts with the game application launch object;
    and if so;
    the game application launch processor is adapted to commence the loading the one or more common components of the game application before the user has selected to launch the game.

15. The game application launch system of claim 13, in which the game application comprises one or more components used during the most recent state of play of the game by a user,
    the game application launch processor is adapted to access a data file indicating a most recent state of play of the game by the user; and
    the game application launch processor is adapted to commence loading one or more components required to launch the game into a playable state corresponding to the indicated most recent state of play.

* * * * *